Patented Dec. 14, 1948

2,456,315

UNITED STATES PATENT OFFICE 2,456,315

PROCESS FOR MAKING AMINES

William W. Prichard, Claymont, Del., assignor to E. I. du Pont de Nemours & Company, Wilmington, Del., a corporation of Delaware No Drawing. Application February 27, 1946, Serial No. 650,737

5 Claims. (Cl. 260—563)

This invention relates to hydrogenation processes, and more particularly to the production of amines by said processes.

An object of this invention is a new method for the preparation of amines. Another object is a catalytic method of converting carboxylic acid diesters of 1,1-glycols to amines. Other objects are to advance the art.

The above objects are accomplished by the following invention which comprises subjecting a carboxylic acid diester of a 1,1-glycol to the action of hydrogen in the presence of at least one mole of a substance of the class of ammonia and primary and secondary amines per mole of diester, and a hydrogenation catalyst.

In one preferred embodiment, a reactor is charged with the mentioned diester and an equal weight of methanol as a solvent. To this charge is added about 2%, by weight of the mentioned diester, of a hydrogenation catalyst selected from group VIII of the periodic table and at least one mole of anhydrous ammonia per mole of the carboxylic acid diester of a 1,1-glycol. The reactor is closed, placed on an agitating rack and pressured with hydrogen to at least 100 lb./sq. in. and the reaction mixture heated to a temperature in the range of 50° C. to 200° C. After hydrogen absorption ceases the reactor is cooled, opened, and the contents discharged and filtered to remove the catalyst. The reaction product is separated from the methanol and excess ammonia, treated with alkali to liberate the amine, and the amine recovered by distillation or by other means known to the art.

The examples which follow are illustrative of methods for practicing the invention. Unless otherwise stated parts are by weight.

Example I

Fifty parts of hexahydrobenzylidene diacetate, 5 parts of Raney nickel, 80 parts of methanol, and 20 parts of ammonia are charged into a 400 cc. stainless steel reactor and hydrogenated under 2000 lb./sq. in. hydrogen pressure at 100° C. for 4 hours. At the end of this time the product is discharged and the catalyst is removed by filtration. The solvent is removed by distillation at atmospheric pressure, the excess ammonia being vaporized concurrently. The residual product is distilled to give 29 parts of hexahydrobenzylammonium acetate, B. P., 107–137° C.

An alternative method for isolation of the amine comprises removal of the solvent by distillation, addition of excess aqueous alkali to the residue to neutralize the acetic acid liberated in the hydrogenolysis, and then steam-distillation of the alkaline solution to recover the amine. Twenty-eight parts of hexahydrobenzylamine is obtained in this way. The hexahydrobenzylamine has the following constants: B. P., 64–65° C./25 mm., $d_4^{25}=0.8682$, $n_D^{30}=1.4579$.

Example II

Fifty parts of hexahydrobenzylidene diacetate, 80 parts of methanol, 35 parts of ethylamine, and 5 parts of Raney nickel are heated in a pressure vessel at 75–100° C. under 2000 lb./sq. in. hydrogen pressure for 4 hours. At the end of this time the product is discharged, the catalyst is separated by filtration and the methanol removed by distillation at atmospheric pressure. The viscous residue obtained is made strongly alkaline with sodium hydroxide solution and steam distilled. The steam distillate is extracted with ether and the ether solution is treated with 10% hydrochloric acid to remove the basic constituents. The amine is liberated from the aqueous acid solution by addition of sodium hydroxide, dried over anhydrous sodium sulfate, and distilled. There is obtained 30 parts of N-ethyl hexahydrobenzylamine boiling at 91–94° C./37 mm.

Example III

Fifty parts of hexahydrobenzylidene diacetate, 5 parts of alloy-skeleton nickel catalyst, 50 parts of diethylamine, and 80 parts of methanol are charged into a 400 cc. stainless steel reactor and hydrogenated at 2000 lb./sq. in. hydrogen pressure at 85° C. for 3 hours. After discharging the contents of the reactor, the catalyst is removed by filtration and the methanol is removed by distillation at atmospheric pressure. Fifty parts of 40% sodium hydroxide is added to the residue and the alkaline solution is steam distilled. There is thus obtained, 34 parts of N,N-diethylhexahydrobenzylamine, B. P. 101°–104° C./37 mm. $N_D^{25}$—1.45646.

Although in the above examples there have been used certain conditions of temperature and pressure, concentration, duration of reaction, etc., it is to be understood that these values may be varied somewhat within the scope of the invention.

In general, the process is operable at temperatures ranging from 50 to about 200° C. As a rule, the process is operated at temperatures in the range 60° to 125° C. since under these conditions the reaction takes place at a practicable rate with the production of the desired amines in maximum yield.

Hydrogenation is carried out at pressures in excess of atmospheric. For best results pressures which are in excess of 100 lb./sq. in. and generally in excess of 300 lb./sq. in. are used since under such conditions satisfactory reaction rates are obtained. The upper pressure limit, however, is determined only by the structural limitations of the equipment employed.

The process may be carried out in the absence of a solvent, but it is generally operated in the presence of an organic solvent such as an alcohol, ether, or hydrocarbon. Examples of specific, operable, organic solvents are methanol, ethanol, propanol, isopropanol, dioxane, cyclohexane, etc.

The amount of catalyst used depends upon the activity of the catalyst. In general, the amount of catalyst used is that needed to bring about reaction at a suitable rate under the temperature and pressure conditions employed. Usually the amount will vary from about 1% to 15% based on the weight of carboxylic acid diester of a 1,1-glycol. Generally the amount of catalyst employed is in the range 5 to 12% based on the weight of this diester since within this range the reaction proceeds at a practical rate.

The metals of the eighth group of the Periodic Table, especially iron, cobalt and nickel, have proved particularly suitable and their catalytic efficacy can be increased by the addition of activators such as the oxides and hydroxides of alkali metals, chromium, manganese, aluminum, thorium or magnesium. The catalyst may be employed in massive form or in finely divided form on suitable carriers such as kieselguhr and the like.

As previously stated, particularly useful catalysts are metallic iron, nickel, and cobalt. These may be used in their pyrophoric or stabilized forms. Pyrophoric catalysts can be prepared by any method giving an active form of the metal. These pyrophoric metal catalysts may be supported or unsupported, and may be made by reducing an oxide, hydroxide, or reducible salt of iron, nickel, or cobalt with hydrogen at a relatively high temperature, the metal not being exposed to an oxidizing atmosphere prior to use. These pyrophoric metals may be stabilized by exposure to an oxidizing atmosphere, while maintaining the temperature of the catalyst mass below 25° C.

The process of this invention may be effected as a liquid or vapor phase operation. It may be also effected as a batch, semi-continuous, or continuous operation.

Although the process is most useful in the preparation of primary amines from carboxylic acid diesters of 1,1-glycols and ammonia it may also be used in the preparation of secondary and tertiary amines by employing suitable primary or secondary amines in the hydrogenation in place of ammonia. Suitable examples of such amines are methyl, ethyl, propyl, butyl, amyl, octyl, and decyl amines, diethylamine, diamylamine, dioctylamine, methyl decylamine, octadecyldecylamine, didodecadecylamine, 1,2-diaminoethane, 1,6-diaminohexane, 1,8-diaminooctane, aniline, cyclohexylamine, p,p'-diaminodiphenyl, p,p'-diaminodicyclohexyl, piperidine, and the like.

The amount of ammonia or primary or secondary amine used should be at least one mole per mole of the carboxylic acid diester of a 1,1-glycol. It is generally desirable, however, to use an excess of ammonia or primary or secondary amine ranging from 1½ to 100 moles per mole of the diester.

In place of the specific diester of the examples, there can be used other carboxylic acid diesters of 1,1-glycols having the general formula

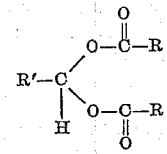

wherein R and R' are hydrocarbon radicals of the class of aliphatic, aromatic, and cycloaliphatic radicals. Specific examples of compounds operable in the practice of this invention are methylidene, ethylidene, propylidene, isopropylidene, and dodecylidene diactates, dipropionates or dibenzoates, benzylidene and xylylidene diacetates, cyclic esters such as ethylidene succinate or hexahydrobenzylidene phthalate.

As many apparently widely different embodiments of this invention may be made without departing from the spirit and scope thereof, it is to be understood that I do not limit myself to the specific embodiments thereof except as defined in the appended claims.

I claim:
1. A process for making amines which comprises heating at a temperature of from 50° C. to 200° C. in contact with hydrogen under a pressure of at least 100 pounds per square inch and a hydrogenation catalyst a carboxylic acid diester of a 1,1-glycol and at least one mole per mole of diester of a substance selected from the group consisting of ammonia, primary amines, and secondary amines, the amino group in said amines being the sole functional group contained therein.

2. A process for making amines which comprises heating at a temperature of from 50° C. to 200° C. under a pressure of at least 100 pounds per square inch hydrogen, a hydrogenation catalyst selected from Group VIII of the Periodic Table, a carboxylic acid diester of a 1,1-glycol, and at least one mole per mole of diester of a substance selected from the group consisting of ammonia, primary amines and secondary amines, the amino group in said amines being the sole functional group contained therein, said diester being of the general formula

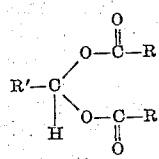

wherein R and R' are hydrocarbon radicals selected from the group consisting of aliphatic, aromatic, and cycloaliphatic radicals.

3. The process set forth in claim 2 in which said diester is hexahydrobenzylidene diacetate.

4. The process set forth in claim 1 in which said substance is an aliphatic amine.

5. The process set forth in claim 1 in which said substance is ammonia.

WILLIAM W. PRICHARD.

REFERENCES CITED

The following references are of record in the file of this patent:

UNITED STATES PATENTS

| Number | Name | Date |
|---|---|---|
| 2,116,971 | Schmidt | July 25, 1939 |

FOREIGN PATENTS

| Number | Country | Date |
|---|---|---|
| 599,103 | Germany | Sept. 15, 1932 |
| 781,960 | France | May 25, 1935 |